March 17, 1936.  E. T. CONDON  2,034,088
ADJUSTABLE BRAKE SHOE ROLLER PIN
Filed Nov. 10, 1934
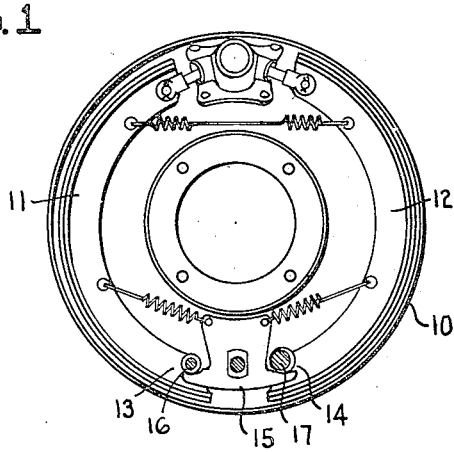
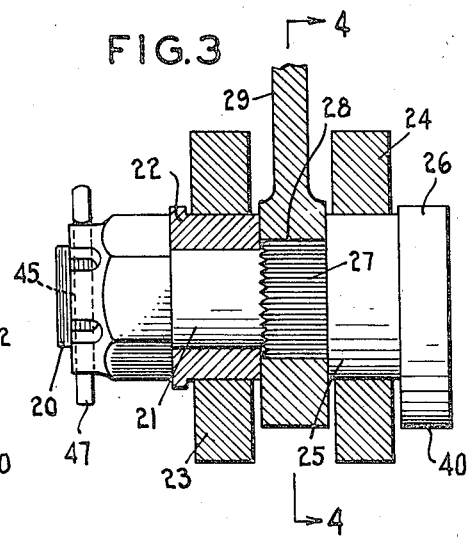
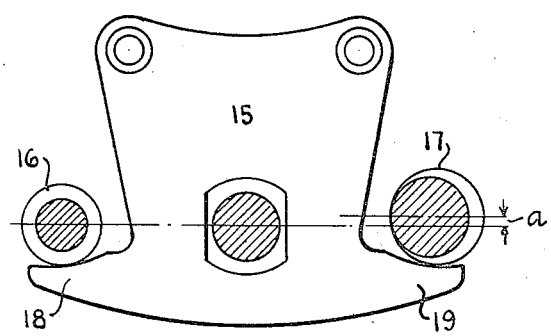
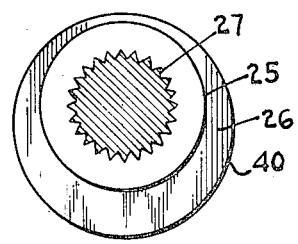
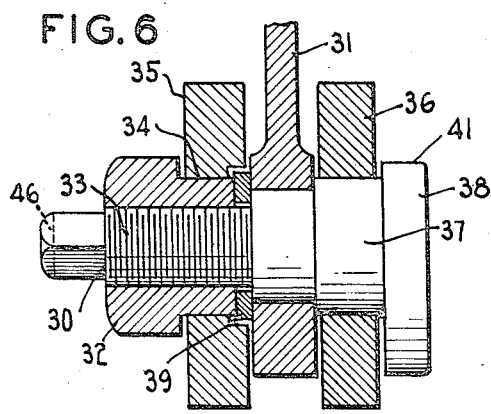
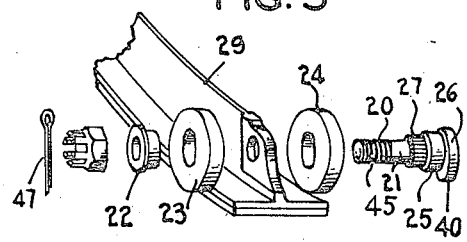
INVENTOR.
EDWARD T. CONDON
BY
ATTORNEY.

Patented Mar. 17, 1936

2,034,088

UNITED STATES PATENT OFFICE 2,034,088

ADJUSTABLE BRAKE SHOE ROLLER PIN

Edward T. Condon, New York, N. Y.

Application November 10, 1934, Serial No. 752,387

2 Claims. (Cl. 188—79.5)

The invention relates to braking systems for automobiles, and more particularly to the supporting means for the free ends of the brake shoes adapted under the action of wedging means for engagement with a brake drum thereof.

It has for an object the provision of an adjustable stud or roller pin adapted to be secured to the free end of a brake shoe and whereby wear of a pin may readily be accommodated to maintain a shoe in proper cooperating relation to the braking surface of the drum.

A still further object of the invention resides in the provision of simple indicating means to assist in securing a ready and accurate adjustment of the pin.

In carrying out the invention, there is associated with the conventionally mounted wedge and shoes of a brake mechanism a pair of eccentric pins for the respective free ends of the shoes, and which pins may initially be installed therewith or be substituted for a worn one of the usual type. To this end, provision is made to secure suitably the novel pin in fixed relation to a brake shoe rib, said pin having a circular bearing head integral therewith but eccentrically positioned with respect to the longitudinal axis of the pin. The arrangement is such, moreover, that should wear occur, the pin as a whole can readily be repositioned in a different angular relationship to accommodate the wear.

The nature of the invention, however, will best be understood when described in connection with the accompanying drawing, in which:

Fig. 1 is a front elevation of a brake drum with pair of associated brake shoes, and shoe roller pins—one of the pins being of the conventional type and showing wear, while the other pin is of the novel type and adjusted to correct for wear.

Fig. 2 is an enlarged detail view of the conventional cam-carrier bracket and associated roller pins, one being of the conventional type and the other of the novel type.

Fig. 3 is an enlarged detail elevation of the novel roller pin, with associated shoe rib and wedge-engaging rollers shown in vertical section.

Fig. 4 is a vertical section of the pin taken on the line 4—4, Fig. 3, and with rib omitted.

Fig. 5 is an exploded view, in perspective, showing the various parts comprising the novel roller pin assembly and its relation to the end of a brake shoe.

Fig. 6 is a fragmentary elevation and part vertical section illustrating a modification in the manner of fixing the position of the pin with reference to the shoe rib.

Referring to the drawing, 10 designates a brake drum and 11 and 12 a pair of associated brake shoes which are adapted to be expanded into engagement with said drum by a wedge member (not shown), the drum, brake shoes and wedge member being of the conventional type and the operation thereof well understood and forming no particular part of the present invention. Heretofore, it has been the practice to fix to the respective ends 13 and 14 of the said shoes suitable roller pins which are adapted to rest upon the respective arms of a cam-carrier bracket 15 which may be of the conventional type. These arms support the ends of the shoes through said pins to maintain said shoes normally at a predetermined displacement from the corresponding surfaces of the brake drum and whereby, when the shoes are expanded for engagement therewith, such engagement will be substantially uniform thereover to apply a uniform braking effect. In the course of time, however, the pins show wear; and, as a result, the corresponding end of a shoe drops and causes an undue and non-uniform displacement between a shoe and its drum portion so that only a small portion of the shoe is effective.

It is the purpose of the present invention to provide a pin or stud member which will enable such displacement to be readily corrected in restoring the free end of a shoe to its proper location. In Fig. 1, the pin 16 is shown as of the conventional type and is indicated, also, as having become sufficiently worn to cause the end 13 of the shoe 11 to drop an objectionable amount; whereas pin 17 is shown as of the novel type replacing the worn pin of shoe 12 and as having been adjusted to make the required correction.

This is more clearly indicated in Fig. 2 of the drawing in which the relationship of the two pins 16 and 17 to the arms 18 and 19 of the cam-carrier bracket 15 is indicated. It will be noted that the center of the pin 16 has been displaced by the amount "a" from its normal position, whereas the center of pin 17 coincides with the normal center conforming it to the position for proper separation of the shoe 12 from the drum.

A convenient and preferred manner of assembling such roller pin to accomplish this result is indicated more clearly in Figs. 3, 4 and 5 of the drawing; and as shown therein, the pin comprises essentially a threaded end 20 terminating inwardly in an unthreaded shoulder portion 21 over which is fitted a bushing 22 to receive one of the conventional wedge-engaging rollers 23, the companion roller 24 riding freely on the bearing surface 25 of said pin immediately adjacent its head 26. Between the surface portions 25 and 21, the pin is provided with circumferentially disposed longitudinal driving teeth 27 which are designed to cut cooperating grooves 28 into the rib 29 of a shoe end and thus firmly fix the pin thereto.

Or, as indicated in Fig. 6 of the drawing, a pin 30 may be simply fixed to a rib 31 by means of a locking nut 32 working over the threaded end 33 of the pin, said nut affording also a bearing surface 34 for one of the wedge-engaging rollers 35, the other roller 36 being mounted upon the bearing surface portion 37 immediately behind the head 38 of the pin. A lock washer 39 may be inserted between the inner end of the nut 32 and the rib 31.

A head 26 or 38, while affording a circular bearing surface 40 or 41, respectively, is not located coaxially with respect to the remaining surfaces of the pin and its axis is not coincident with that of the longitudinal axis thereof, but is displaced laterally therefrom so as to provide for eccentric disposition of the head on the pin, as indicated more clearly in Figs. 4 and 5 of the drawing. By this expedient, it will readily be understood that an engaging surface 40 or 41 of a pin may be caused to displace such surface with reference to its associated arm of the cam-carrier bracket 15, as by setting the pin accordingly, to correct for wear of a pin, and will thus be positioned to maintain the proper displacement of a shoe from its cooperating drum braking surface. Should further wear occur, the pin may be driven out from its brake-shoe rib, or the locking nut loosened in the modified embodiment, the pin then adjusted angularly to the desired extent and within the limits of the degree of eccentricity, and replaced and/or locked in the rib.

To assist in such location and adjustment of a pin in a rib, a hole 45, Fig. 3, or a slot 46, Fig. 6, is provided diametrally respectively through and in the outer threaded end of a pin, and in the former embodiment receives a cotter pin 47. The axis of a hole or slot is arranged to lie parallel to a line passing through the respective low and high points of an eccentric surface 26 or 36, whereby the position of the cotter pin, when located in the corresponding hole, or the position of the slot will afford an index of the contacting surface portion.

I claim:

1. In a braking system: a roller pin of the nature set forth having a head eccentrically disposed with reference to the axis of the pin, threaded at its outer end and having longitudinal cutting teeth over a portion between the threaded end and the eccentrically disposed head, the said pin being axially separable from its brake shoe for adjustment.

2. In a braking system: a roller pin of the nature set forth having a head eccentrically disposed with reference to the axis of the pin, provided with longitudinally displaced bearing surfaces, threaded at its outer end, and having longitudinal cutting teeth between the said bearing surfaces, the said pin being axially separable from its brake shoe for adjustment.

EDWARD T. CONDON.